United States Patent [19]
Johnson et al.

[11] 3,903,059
[45] Sept. 2, 1975

[54] NUCLEATION OF POLYOLEFINS

[75] Inventors: Burnett H. Johnson; Terrence Huff, both of Baytown, Tex.

[73] Assignee: Exxon Research and Engineering Company, Linden, N.J.

[22] Filed: Oct. 30, 1972

[21] Appl. No.: 301,939

Related U.S. Application Data

[63] Continuation-in-part of Ser. No. 179,884, Sept. 13, 1971, abandoned.

[52] U.S. Cl.... 260/79.3 R; 260/45.7 P; 260/45.7 S; 260/45.95; 260/93.7; 260/878 R; 260/897 C; 260/897 B; 260/DIG. 35
[51] Int. Cl. ........................................... C08f 27/07
[58] Field of Search ........ 260/79.3 R, 897 B, 897 C

[56] References Cited
UNITED STATES PATENTS
| | | | |
|---|---|---|---|
| 3,022,276 | 2/1962 | Orthner | 260/79.3 R |
| 3,320,218 | 5/1967 | Levine | 260/79.3 R |

*Primary Examiner*—Christopher A. Henderson
*Attorney, Agent, or Firm*—T. B. McCulloch; David A. Roth

[57] ABSTRACT

Nucleation of polyolefins is enhanced by the presence of a polyolefin having an alkali metal sulfonate and chlorine group separately attached thereto and containing an alkali metal hydroxide, preferably sodium hydroxide dispersed in the melt prior to solidification.

8 Claims, 1 Drawing Figure

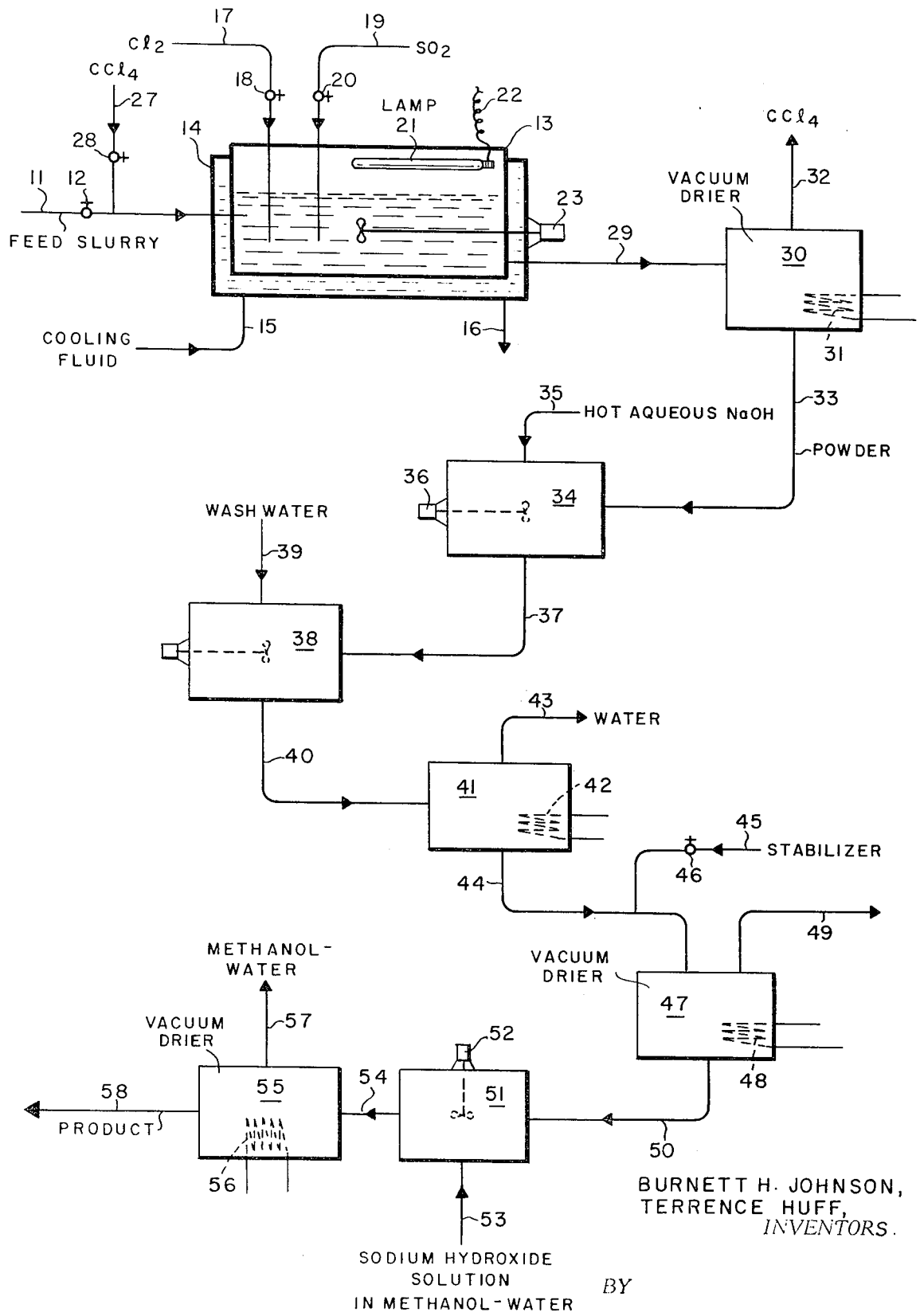

NUCLEATION OF POLYOLEFINS

CROSS-REFERENCE TO RELATED APPLICATION

This application is a continuation-in-part of Ser. No. 179,884, filed Sept. 13, 1971 and now abandoned, for Burnett H. Johnson and Terrence Huff and entitled "Nucleation of Polyolefins."

BACKGROUND OF THE INVENTION

1. Field of the Invention

The present invention is directed to the crystallization of polyolefins. More specifically, the invention is directed to the crystallization of polyolefins wherein chlorine and alkali metal sulfonate groups are separately attached to a polyolefin and an alkali metal hydroxide, preferably sodium hydroxide, is dispersed in the melt prior to solidification.

2. The Prior Art

It is known in U.S. Pat. No. 3,327,021 to add alkali metal salts of certain monosulfonic acids to polyolefins such as polypropylene having a crystalline structure to modify the crystallization process. Thus, sodium salts of sulfonic and aminosulfonic acids have been added to crystalline polyolefins with beneficial results. However, addition of the sodium salts requires separate manufacture of the salts and the separate addition of them and incorporation in the melted polyolefin. We have now found that advantageous results and a new product may be obtained by chlorination and sulfochlorination of crystalline polyolefin wherein chlorine and sulfonyl chloride groups are introduced into the polyolefin molecule followed by treatment to form a chlorinated and alkali metal sulfonated polymer which has beneficial and unobvious properties in that, in the presence of an included alkali metal hydroxide phase, improved nucleation is obtained. Further, we have found that the composition may be stabilized by adding thereto in addition to the alkali metal hydroxide such as, but not limited to, sodium hydroxide a stabilizer which may be 2,6 ditertiary, 3-methyl phenol and any of several known stabilizer packages for polyolefins.

Other prior art is Kulne, C. J. et al., S.P.E. Journal, October 1964. Additional art is U.S. Pat. Nos. 3,022,276 and 3,320,276.

SUMMARY OF THE INVENTION

The present invention is directed to a polyolefin composition of enhanced nucleation which comprises a solid polyolefin of a mono-alpha-olefin having 3 to 8 carbon atoms having a crystalline structure and containing approximately equimolar amounts of chlorine and alkali metal sulfonate groups separately attached to a polyolefin, and having an alkali metal hydroxide, preferably sodium hydroxide, present in an amount effective to improve nucleation, preferably between about 0.5 to 2.0 times the weight percentage of the metal sulfonate present in the polyolefin, having been dispersed in a melt of the polyolefin prior to solidification. The composition of the present invention may be the mixture produced by the chlorination and sulfochlorination of the polyolefin which is converted to the salt or may be a mixture of the alkali metal sulfonated and chlorinated polyolefin which is admixed with virgin crystalline polyolefin. In either case, an alkali metal hydroxide, preferably sodium hydroxide, is dispersed in the polyolefin in an amount effective to enhance nucleation.

BRIEF DESCRIPTION OF THE DRAWING

The invention will be further illustrated by reference to the drawing in which the single FIGURE is a flow diagram of a preferred mode and embodiment.

DESCRIPTION OF THE PREFERRED EMBODIMENTS WITH REFERENCE TO THE DRAWING

Referring now to the drawing, and particularly to the sole FIGURE, numeral 11 controlled by valve 12 designates a feed line in which a slurry of ethylene-propylene copolymer or polypropylene powder in carbon tetrachloride is fed into a reactor vessel 13 provided with a cooling jacket 14 through which cooling fluid circulates by lines 15 and 16 to maintain the temperature in the reactor vessel 13. Reactor vessel 13 is provided with line 17 controlled by valve 18 for admitting chlorine and line 19 controlled by valve 20 for admitting $SO_2$. Reactor vessel 13 is also provided with an ultra-violet light source 21 which receives electrical energy by electrical leads 22 connected to a source of electrical energy. Reactor 13 is also provided with a power driven stirring means 23. Carbon tetrachloride may be introduced into reactor vessel 13 by line 27 controlled by valve 28. After the requisite period of time with chlorine and $SO_2$ being fed into the feed slurry of crystalline polypropylene or crystalline propylene-ethylene copolymer the product is withdrawn by line 29 into a vacuum driver 30 provided with a heating means 31 and a line 32 connected to a source of vacuum not shown by way of which the product is freed of carbon tetrachloride by drying and the carbon tetrachloride is recovered for reuse.

Before this takes place, however, the feed slurry is cut out by closing valve 12 and the product in reactor vessel 13 is washed several times, say four or five times, with carbon tetrachloride introduced by line 27 and valve 28 from a source not shown.

After the vacuum-dried material has been dried in vacuum drier 30, the powder is routed by means 33 into a vessel 34 where it is treated with hot aqueous sodium hydroxide or any other alkali metal hydroxide solution introduced by line 35. After a suitable period of time and agitation with means 36 the product therefrom is removed by line 37 and water washed in means 38 with water introduced by line 39. The wash water is discharged by means not shown and then the washed product is introduced by means 40 into a second vacuum drier 41 which is similar to vacuum drier 30 and provided with a heating means 42, a line 43 for removal of water which is provided with a vacuum means not shown, and line 44 for removal of product. As the product is removed by line 44 stabilizer may be introduced in a suitable solvent by line 45 controlled by valve 46 into a vacuum drier 47 which is similar to the other vacuum driers, being provided with a heating means 48, line 49 for withdrawal of solvent and for pulling vacuum on the drying system, and line 50 for withdrawal of the powder containing the stabilizer. The stabilized product containing the chemical stabilizer is then introduced into a treater 51 provided with a mixing means 52 into which sodium hydroxide solution in methanol and water is introduced by line 53. The contents of treater 51 are stirred by mixing means 52 for the required amount of time and then the product is withdrawn by line 54 into another vacuum drier 55 provided with heating means 56 and line 57 for withdrawal of methanol and water in which the sodium hydroxide solution is dissolved. The vacuum dried and stabilized product stabilized with both the stabilizer introduced by line 45 and the sodium hydroxide by line 53 is withdrawn by line 58 for further use as desired. The product is an improved product, having improved nucleation properties on melting and solidification.

VARIABLES OF THE INVENTION

In the reactor 13 the slurry of crystalline polypropylene or crystalline propylene-ethylene copolymer is exposed to ultra-violet light at a temperature of about 0° to about 70°C., preferably about 3° to 10°C., more preferably 5°C. for a time in the range from about 5 to about 90 minutes. By virtue of this exposure to ultraviolet light in the presence of chlorine and sulphur dioxide introduced by lines 17 and 19 the slurried powdered polyolefin is chlorinated and sulfochlorinated while agitating same with the agitating means 23. Thereafter, the feed slurry having been shut off by closing valve 12, the product is washed with carbon tetrachloride from line 27, say four or five washings with about two pounds of carbon tetrachloride per pound of polymer per wash. The washed material is withdrawn by line 29 into vacuum drier 30 and the carbon tetrachloride removed by heating same to a temperature within the range from about 40° to about 100°C. for a time from about 8 to 24 hours under a reduced pressure of about 1 to 30 millimeters. The powdered sulfochlorinated and chlorinated material is treated at a temperature from about 60° to about 100°C. while agitating from about 3 to about 8 hours in treater 34 with hot aqueous sodium hydroxide which may have a strength within the range between 1.10 to 1.33 specific gravity at 20°C. After the sulfochlorinated and chlorinated polymer has been treated with hot aqueous sodium hydroxide to convert the sulfonyl chloride groups to sodium sulfonate groups it is then subjected to water washing with about 5 water washes in water wash means 38, the water being discharged by means not shown. Thereafter the wet material is sent to another vacuum drier where it is dried at a temperature from about 40° to 100°C. for a time of about 8 to 24 hours. Finally the vacuum dried material may have a stabilizer added to it which may be 2,6 ditertiary, 3-methyl phenol in methanol or other stabilizers such as distearyl thioldipropionate, dilauryl thiol dipropionate, tris (4-nonyl phenyl) phosphite, butyl zimate and the like. The stabilized material is then introduced into a vacuum drier where the solvent for the stabilizer is removed. This solvent may suitably be a solvent as described before. Thereafter the procedure is as shown in the description taken with the drawing.

The polypropylenes employed are powders having better than 93% hot heptane insolubles containing no stabilizers, while the impact propyleneethylene copolymer is a commercial copolymer having better than 80% hot heptane insolubles. This latter material was received as a pelletized material and ground to a fine powder under liquid nitrogen prior to reaction. It contained about 25 weight percent ethylene and was stabilized, the stabilizers not being removed prior to reaction. The sulphur dioxide was anhydrous grade of 99.98% or better purity and was used as received, and the chlorine was 99.5% or better purity used as received. Carbon tetrachloride and sodium hydroxide were reagent grades and were used as received. It is understood that other polymers and copolymers may be used.

Thus, while polyolefins such as illustrated and mixtures of polyolefins may be employed, grafted polyolefins such as acrylic acid and glycidyl acrylate grafted polyolefins may be used with the polymer containing about 0.01% to about 10% by wt. of the grafted component.

Likewise, fillers and reinforcing agents may be used such as glass fibers, talc, bentonite, clays, asbestos, and the like. The amount of the fillers will depend on the degree of reinforcement needed for the particular polymer and usage.

The chlorosulfonation of the polypropylene and the copolymer gives a product containing both $SO_2Cl$ groups and $-Cl$ groups. However, this product has no form of stability as long as the sulfonyl chloride group is present.

The molar ratio of $SO_3Na:NaOH$ in the mass is within the range from about 1.35:1 to about 0.3:1, and the molar ratio of $SO_3Na:Cl$ is within the range of from about 2.0:1 to about 0.1:1. A preferred molar ratio of $SO_3Na:NaOH$ in the mass is from about 0.8:1 to about 0.5:1. A preferred molar ratio of $SO_3Na:Cl$ is from about 1.5:1 to 2:1, although a higher ratio may be used. These ratios may be provided by treating the sulfonated and chlorinated polypropylene or copolymer with an excess of NaOH after the treating and subsequent steps. A nucleating amount of 0.05 to 1.02 mole percent alkali metal sulfonate groups in the polymer is desirable. A preferred range is from about 0.1 to 0.5 mole percent of alkali metal sulfonate groups in the polymer. In any event, the presence of a nucleating amount of NaOH as such is important in stabilizing the mass and in improving the nucleation rate of the polymer on solidifying from the melt.

While the foregoing ratios and amounts are given for the sodium sulfonate groups and NaOH, the ratios and amounts apply equally to the other alkali metal sulfonates and hydroxides.

In the following table the mechanical property data on injection specimens of sodium sulfonated and chlorinated polypropylene-ethylene copolymer are shown.

TABLE I

MECHANICAL PROPERTY DATA ON INJECTION MOLDED SPECIMENS

| Sample of | Polypropylene | | | | | 75% by wt. Propylene-25% by wt. Ethylene Copolymer | | | |
|---|---|---|---|---|---|---|---|---|---|
| | Homo-polymer | Homo-polymer 1 | Homo-polymer ($SO_3Na^+$) ($SO_3Na^+$) + NaOH | Homo-polymer 2 | Homo-polymer ($SO_3Na^+$) + NaOH | Lot 1 | Lot 1 ($SO_3Na^+$) +NaOH | Lot 2 | Lot 2 ($SO_3Na^+$) +NaOH |
| Wt.% $SO_3Na^+$ (1) | None | 5.02 | 0.32 | None | 1.67 | None | 0.16 | None | 0.64 |
| Wt.% Cl | None | 1.6 | 0.7 | None | 0.39 | None | 0.05 | None | 0.26 |
| Wt.% NaOH | None | None | 0.68 | None | 1.00 | None | 0.18 | None | 0.40 |

TABLE I—Continued

MECHANICAL PROPERTY DATA ON INJECTION MOLDED SPECIMENS

| Sample of | Polypropylene | | | | | 75% by wt. Propylene-25% by wt. Ethylene Copolymer | | | |
|---|---|---|---|---|---|---|---|---|---|
| | Homo-polymer 1 | Homo-polymer 1 ($SO_3^-Na^+$) | Homo-polymer 1 ($SO_3^-Na^+$) + NaOH | Homo-polymer 2 | Homo-polymer 2 ($SO_3^-Na^+$) + NaOH | Lot 1 | Lot 1 ($SO_3^-Na^+$) +NaOH | Lot 2 | Lot 2 ($SO^-Na^+$) +NaOH |
| $MF_{230}$ | 0.3 | <0.01 | 0.06 | 3.0 | 0.10 | 3.9 | 2.3 | 3.9 | 0.1 |
| Flex. Modulus $10^{-3}$(psi) | 195 | 168 | 214 | 200 | 232 | 137 | 155 | 143 | 161 |
| Tensile, Yield (psi) | 6067 | — | 7010 | 5104 | 6070 | 4084 | 4073 | 3582 | 4094 |
| % Elong., Yield | 25.0 | — | 42.0 | 14.1 | 28.1 | 12.0 | 16.7 | 8.3 | 17.7 |
| Room Temp. Notched Izod (ft-lbs/in notch) | 2.2 | 3.1 | 5.3 | 1.5 | 1.3 | 3.0 | 2.7 | 4.7 | 3.6 |
| Unnotched Izods at 0° F. | 5.0 | 8.6 | 7.5 | 9.1 | 7.2 | NB | NB | 36.9 | 33.2 |
| −20° F. | 5.1 | 9.5 | 6.7 | 5.7 | 6.1 | 21.2 | 37.2 | 27.9 | 27.1 |
| −40° F. | 5.2 | — | 8.6 | 5.7 | 6.2 | 22.5 | 19.9 | 24.4 | 25.5 |
| Cryst. 1/2 Time at 135° C. (min.) | 3.1 | — | 0.5 | 11.4 | 0.6 | 5.6 | 1.8 | 5.9 | 0.4 |
| $T_c(°C.)^2$ | 118 | 118 | 124 | 117 | 126 | 120 | 122 | 120 | 130 |

[1] All run at $SO_2/Cl_2$ ratio = 2.5/1. Temp. = 5° C.....molar ratio $SO_3^-Na^+/Cl \cong 0.8$.
[2] $T_c$ = Cryst. Temp. from temp. Perkin — Elmer DSC–1B at $\Delta T = -10°C./Min.$ and is related to nucleation rate.

Homopolymers (1) and (2) are merely different grades of polypropylene employed in Tables I and II.

The dual requirement of both alkali metal sulfonate groups on the polymer and an included alkali metal hydroxide such as sodium hydroxide phase in order to obtain a highly nucleated polymer are shown in Table II.

TABLE II

NUCLEATION DATA ON SELECTED POLYPROPYLENE SAMPLES

| Sample of:[1] | Wt. % $SO_3^-Na^+$ | Wt. % $Na^+OH^-$ | $T_c^2$ |
|---|---|---|---|
| Homopolymer[2] | None | None | 117°C. |
| " Na⁺OH⁻ | None | 0.5 | 116°C. |
| " $SO_3^-Na^+$ [3] | 0.4 | None | 117°C. |
| " $SO_3^-Na^+$ [3] | 3.0 | None | 120°C. |
| " $SO_3^-Na^+$,Na⁺OH⁻ [3] | 0.4 | 0.2 | 125°C. |
| " $SO_3^-Na^+$,Na⁺OH⁻ [3] | 3.0 | 3.0 | 125°C. |
| Lot 2 | None | None | 120°C. |
| Lot 2, Na⁺OH⁻ | None | 0.5 | 120°C. |
| Lot 2, $SO_3^-Na^+$ [3] | 0.4 | None | 120°C. |
| Lot 2, $SO_3^-Na^+$, Na⁺OH⁻ [3] | 0.4 | 1.0 | 130°C. |

[1] Sample designation as in Table I
[2] 1, definition and significance as in 2, Table I
[3] Molar ratio $SO_3^-Na^+/Cl$ in these polymer ≅ 0.8

Sodium sulfonated polypropylenes containing an included sodium hydroxide phase are also useful as additives to unmodified resin for mechanical property improvement.

EXAMPLE I

Blend I 400 gms homopolypropylene powder were bag mixed with 100 gms of homopolypropylene ($SO_3^-Na^+$) powder (sodium sulfonated polypropylene). Sodium polypropylene, prepared as described previously contains 1.7 wt.% $SO_3^-Na^+$ and 1.0 wt.% NaOH.

Blend II 400 gms homopolypropylene powder (1) were bag mixed with 100 gms of the unmodified homopolypropylene powder used to prepare sodium sulfonated polypropylene.

Each powder blend was extruded (450°F.), pelletized, and injection molded to test specimens (470°F.).

Properties of the two blends are shown in Table III.

EXAMPLE II

Blend III 400 gms of $C_3=/C_2=$ (ethylene-propylene) copolymer powder were bag mixed with 100 gms of ($SO_3^-Na^+$) copolymer powder of the present invention. This copolymer contains 0.49 wt.% $SO_3^-Na^+$ and 0.28 wt.% NaOH.

Blend IV 400 gms of ethylene-propylene copolymer powder of the present invention were bag mixed with 100 gms of the unmodified ethylene-propylene copolymer powder used to prepare copolymer of the present invention.

Each powder blend was extruded (450°F.), pelletized, and injection molded to test pieces (470°F.).

Properties of the blends are shown in Table III.

TABLE III

Properties of Blends Containing Polypropylene Sodium Sulfonates and Sodium Hydroxide

| | Blend I | Blend II | Blend III | Blend IV |
|---|---|---|---|---|
| $MF_{230}$ | 0.42 | 0.72 | 0.27 | 0.26 |
| Flex. Modulus (psi) | 188,000 | 160,000 | 145,000 | 124,000 |
| Room Temperature Notched Izod (ft.-lbs/in. notch) | 1.2 | 1.4 | 5.9 | 4.7 |
| Unnotched Izod at 0° F. | — | — | 28.4 | 27.6 |
| −20° F. | 4.9 | 4.8 | 24.8 | 21.8 |
| −40° F. | — | — | 20.4 | 21.8 |
| $T_c$ (C)* | 127.0 | 119.7 | 127.0 | 120.5 |

*See Table I for description

Again the improvement in both nucleation rate and mechanical properties was obtained in the blends containing the sodium sulfonated and chlorinated polypropylenes containing an included sodium hydroxide phase.

It will be seen from a comparison of the various polypropylene that the sodium hydroxide contributed to the improved nucleation rate and mechanical properties of both the polypropylene and the copolymer.

The present invention is quite advantageous and useful and may be used as molding grade polypropylene for making various articles.

The invention is unique and unobvious in that the sodium sulfonate and the chlorine are attached separately into the polypropylene and the sodium hydroxide functions to enhance the nucleation rate and along with the other stabilizers adds stability to the mass. We have, therefore, invented a new, unobvious and useful composition and method for producing same.

The nature and objects of the present invention having been completely described and illustrated and the best modes and embodiments contemplated set forth, what we wish to claim as new and useful and secure by letters patent is:

1. A method for preparing chlorinated and sulfonated solid polyolefin of an alpha mono-olefin having 3 to 8 carbon atoms in the molecule which comprises:

exposing a stirred slurry of solid crystalline polyolefin powder is carbon tetrachloride to a sufficient amount of $SO_2$ and $Cl_2$ in the presence of light for a sufficient length of time at a sufficient temperature to sulfochlorinate and chlorinate said solid polyolefin;

drying the resultant slurry of sulfochlorinated and chlorinated polyolefin;

treating said dried sulfochlorinated and chlorinated polyolefin with a hot aqueous alkali metal hydroxide solution to convert said sulfochlorinated polyolefin to the alkali metal sulfonate form;

drying the treated chlorinated and alkali metal sulfonated polyolefin; and then stabilizing the last dried polyolefin by adding thereto at least a sufficient amount of alkali metal hydroxide;

with the proviso that the amounts of $SO_2$, $Cl_2$, aqueous metal hydroxide solution and alkali metal hydroxide added thereto are sufficient to provide said polyolefin with a molar ratio of the alkali metal sulfonate group: alkali metal hydroxide within the range from about 1:35:1 to about 0.3:1, the molar ratio of the alkali metal sulfonate group: Cl within the range of from about 2.0:1 to about 0.1:1, and the alkali metal sulfonate groups constitute from about 0.05 to about 1.02 mole per cent of said polyolefin.

2. A method in accordance with claim 1 in which the alkali metal hydroxide is sodium hydroxide.

3. A method in accordance with claim 1 in which the slurry is exposed to $SO_2$ and $Cl_2$ for a time within the range of about 5 to about 90 minutes at a temperature of about 0° to about 70°C.

4. A method in accordance with claim 1 in which the dried chlorinated and sulfochlorinated polyolefin is treated at a temperature from about 60° to about 100°C. while agitating for about 3 to 8 hours to convert the sulfochlorinated polyolefin to the alkali metal sulfonate form.

5. A method in accordance with claim 1 in which:
  a. the alkali metal hydroxide is sodium hydroxide;
  b. the slurry is exposed to $SO_2$ and $Cl_2$ for a time within the range of about 5 to about 90 minutes at a temperature of about 0° to about 70°C.

6. A method in accordance with claim 5 in which the dried chlorinated and sulfochlorinated polyolefin is treated at a temperature from about 60° to about 100°C. while agitating for about 3 to about 8 hours to convert the sulfochlorinated polyolefin to the alkali metal sulfonate form.

7. A method in accordance with claim 1 in which the polyolefin comprises a propylene-ethylene copolymer.

8. A method in accordance with claim 1 in which the polyolefin is polypropylene.

* * * * *